United States Patent [19]
Buchler et al.

[11] Patent Number: 5,543,804
[45] Date of Patent: Aug. 6, 1996

[54] NAVAGATION APPARATUS WITH IMPROVED ATTITUDE DETERMINATION

[75] Inventors: Robert J. Buchler, Calabasas Park; Allan J. Brockstein, Chatsworth; David Y. Hsu, Agoura, all of Calif.

[73] Assignee: Litton Systems, Inc., Beverly Hills, Calif.

[21] Appl. No.: 305,400

[22] Filed: Sep. 13, 1994

[51] Int. Cl.$^6$ ............................... H04B 7/185; G01S 5/02
[52] U.S. Cl. ............................................. 342/357
[58] Field of Search ........................... 342/357; 455/12.1

[56] References Cited

U.S. PATENT DOCUMENTS

| | | | |
|---|---|---|---|
| 5,185,610 | 2/1993 | Ward et al. | 342/357 |
| 5,359,332 | 10/1994 | Allison et al. | 342/357 |

*Primary Examiner*—Theodore M. Blum

[57] ABSTRACT

The navigation apparatus with improved attitude determination is intended for use on a mobile platform. It combines data from a platform inertial navigation unit and carrier phase data for a plurality of GPS satellite signals received at a plurality of receiving points on the platform for the purpose of obtaining estimates of the navigation states of the platform. The navigation apparatus comprises a processor which computes estimates of the states from inputs comprising (1) one or more measured phase double-differences calculated from the measured satellite signal carrier phases, (2) the estimated position of the platform, (3) the estimated positions of the receiving points, and (4) the positions of the satellites, a phase double-difference being defined as the difference in phase differences for signals received from two satellites and a phase difference being defined as the difference in carrier phase of a satellite signal received at two receiving points. The navigation and attitude determination solution is obtained by means of a Kalman filter process wherein the observables comprise measured phase double-differences and each predicted phase double-difference is obtained by operating on the Kalman state vector with an observation matrix defined by linearizing the equations relating the phase double-difference to the navigation states.

46 Claims, 16 Drawing Sheets

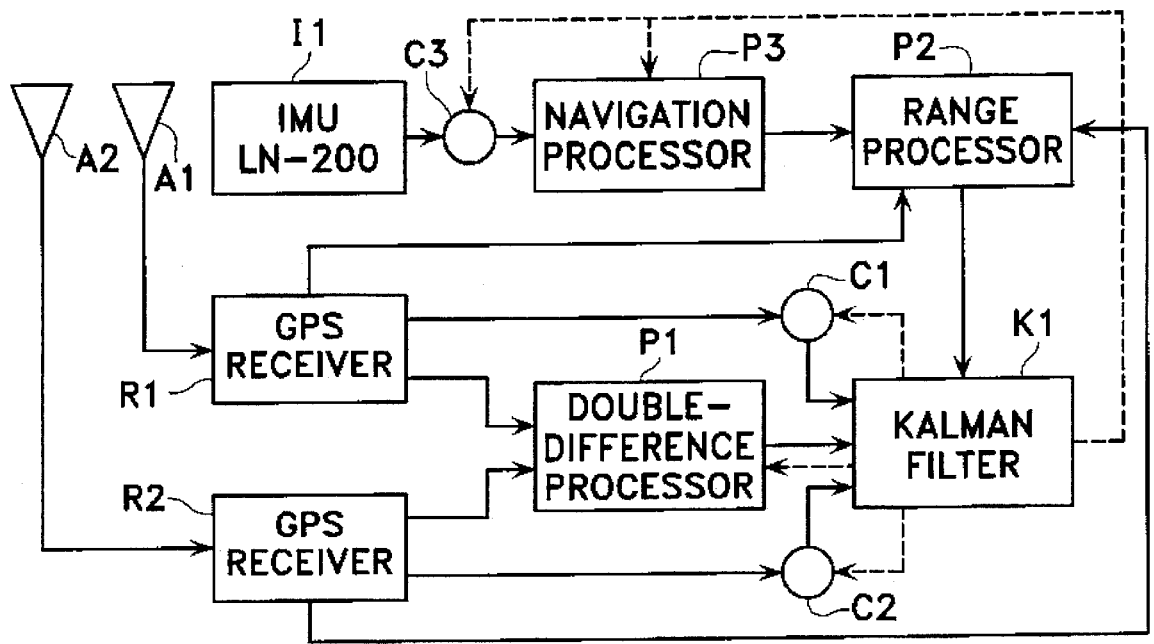
FIG. 3
FIG. 4
$$\bar{S}_1 = \bar{U}_1 + \bar{p}_{11} = \bar{U}_2 + \bar{p}_{21}, \quad \bar{U}_1 = \bar{U}_0 + \bar{L}_1;$$
$$\bar{S}_2 = \bar{U}_1 + \bar{p}_{12} = \bar{U}_2 + \bar{p}_{22}, \quad \bar{U}_2 = \bar{U}_0 + \bar{L}_1 + \bar{L}_2.$$
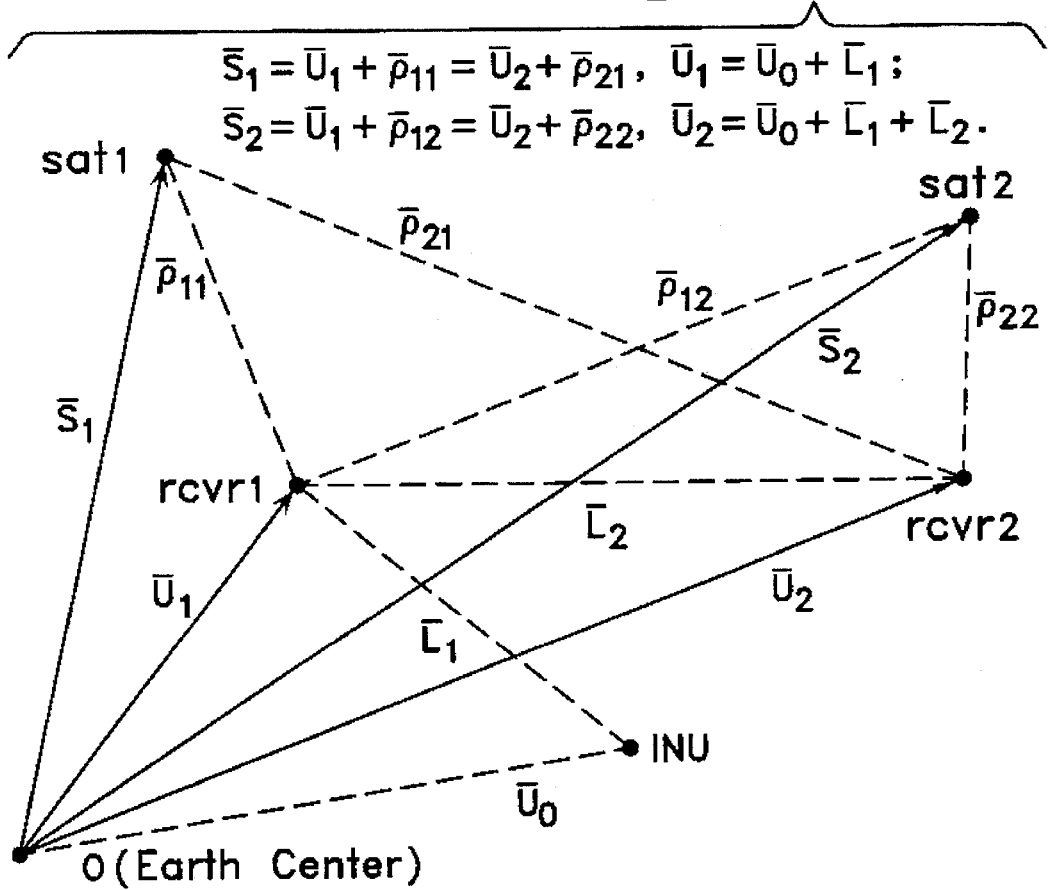

$$P = \rho + c(dt - dT) + dion + dtrop$$

- P : pseudo-range
- $\rho$ : true range
- dt : satellite clock error
- dT : receiver clock error
- dion : ionospheric effect
- dtrop : tropospheric effect

FIG. 5

$$\Phi = \rho + c(dt - dT) + \lambda N + dion + dtrop$$

- $\Phi$ : carrier phase observation
- $\rho$ : true range
- $\lambda$ : carrier wavelength, 19 cm for $L_1$ carrier
- N : initial integer ambiguity
- dt : satellite clock error
- dT : receiver clock error
- dion : ionospheric effect
- dtrop : tropospheric effect

FIG. 6

Clock Errors Elimination $$\Phi_{12} = \rho_{12} + c(dt_2 - dT_1) - dion12 + dtrop12 + \lambda N12$$

$$\Phi_{21} = \rho_{21} + c(dt_1 - dT_2) - dion21 + dtrop21 + \lambda N21$$

$$\Phi_{11} = \rho_{11} + c(dt_1 - dT_1) - dion11 + dtrop11 + \lambda N11$$

$\Phi_{12} - \Phi_{11}$ = difference between satellites $\Rightarrow dT_1$ cancelled $\Phi_{21} - \Phi_{11}$ = difference between receivers $\Rightarrow dt_1$ cancelled

FIG. 7

$$DD\Phi = (\Phi_{22} - \Phi_{21}) - (\Phi_{12} - \Phi_{11}) = \nabla\Phi_2 - \nabla\Phi_1 = \Delta\nabla\Phi$$

= 2 differences between satellites followed by 1 difference between receivers $$= (\Phi_{22} - \Phi_{12}) - (\Phi_{21} - \Phi_{11}) = \Delta\Phi_2 - \Delta\Phi_1 = \nabla\Delta\Phi$$

= 2 differences between receivers followed by 1 difference between satellites

FIG. 8

$$DD\Phi = (\rho_{22} - \rho_{21} - \rho_{12} + \rho_{11})$$
$$+$$
$$\lambda(N22 - N21 - N12 + N11)$$
$$-$$
$$[(dion22 - dion12) + (dion11 - dion21)]$$
$$+$$
$$(dtrop22 - dtrop12) + (dtrop11 - dtrop21)$$

FIG. 9

$$DD\rho \equiv (\rho_{22} - \rho_{21} - \rho_{12} + \rho_{11})$$
$$= \text{true double differenced range}$$

$$(DD\rho)_m \equiv DD\Phi$$
$$= \text{measured double differenced range}$$

$$(DD\rho)_c \equiv (p_{22} - p_{21} - p_{12} + p_{11})$$
$$= \text{computed double differenced range}$$

where $p_{ij}$ = computed range from receiver i to satellite j

FIG. 10

$$z = (DD\rho)_c - DD\Phi = (DD\rho)_c - (DD\rho)_m$$

$$= [(DD\rho)_c - DD\rho] - [(DD\rho)_m - DD\rho]$$

$$= (\delta DD\rho)_c - (\delta DD\rho)_m$$

$$= H\tilde{x} + \eta$$

H = Observation matrix
$\tilde{x}$ = Kalman state residuals
$\eta$ = noise

FIG. 11

$$(\delta DD\rho)_c = (DD\rho)_c - DD\rho$$

$$= (P_{22} - P_{21} - P_{12} + P_{11}) - (\rho_{22} - \rho_{21} - \rho_{12} + \rho_{11})$$

$$P_{ij} - \rho_{ij} = \sqrt{\overline{P}_{ij} \cdot \overline{P}_{ij}} - \sqrt{\overline{\rho}_{ij} \cdot \overline{\rho}_{ij}} =$$

$$\sqrt{(\overline{S}_j + d\overline{S}_j - \overline{U}_i - d\overline{U}_i) \cdot (\overline{S}_j + d\overline{S}_j - \overline{U}_i - d\overline{U}_i)} - \sqrt{(\overline{S}_j - \overline{U}_i) \cdot (\overline{S}_j - \overline{U}_i)} =$$

$$\sqrt{[(\overline{S}_j - \overline{U}_i) + (d\overline{S}_j - d\overline{U}_i)] \cdot [(\overline{S}_j - \overline{U}_i) + (d\overline{S}_j - d\overline{U}_i)]} - \sqrt{(\overline{S}_j - \overline{U}_i) \cdot (\overline{S}_j - \overline{U}_i)} =$$

$$\sqrt{(\overline{S}_j - \overline{U}_i) \cdot (\overline{S}_j - \overline{U}_i) + 2(\overline{S}_j - \overline{U}_i) \cdot (d\overline{S}_j - d\overline{U}_i) + o(2)} - \sqrt{(\overline{S}_j - \overline{U}_i) \cdot (\overline{S}_j - \overline{U}_i)}$$

$$\approx [2(\overline{S}_j - \overline{U}_i) \cdot (d\overline{S}_j - d\overline{U}_i)]/(2\rho_{ij})$$

$$= (\overline{S}_j - \overline{U}_i) \cdot (d\overline{S}_j - d\overline{U}_i)/\rho_{ij} = \overline{p}_{ij} \cdot (d\overline{S}_j - d\overline{U}_i)/\rho_{ij}$$

FIG. 12

$$(\delta DD\rho)_c = \sum_{i=1}^{2}\sum_{j=1}^{2}(-1)^{(i+j)}(\bar{S}_j-\bar{U}_i)\cdot(d\bar{S}_j-d\bar{U}_i)/\rho_{ij}$$

$$= \sum_{i=1}^{2}\sum_{j=1}^{2}(-1)^{(i+j)}\overline{p}_{ij}\cdot(d\bar{S}_j-d\bar{U}_i)/\rho_{ij}$$

where $p_{ij} = \sqrt{\overline{(\bar{S}_j+d\bar{S}_j-\bar{U}_i-d\bar{U}_i)\cdot(\bar{S}_j+d\bar{S}_j-\bar{U}_i-d\bar{U}_i)}}$ and $\rho_{ij} = \sqrt{(\bar{S}_j-\bar{U}_i)\cdot(\bar{S}_j-\bar{U}_i)}$ for $i,j = 1,2$.

FIG. 13

$S_{1n} = C_f^n \cdot S_{1f} = U_{on} + L_{1n} + \rho_{11n} = U_{on} + L_{1n} + L_{2n} + \rho_{21n}$ $S_{2n} = C_f^n \cdot S_{2f} = U_{on} + L_{1n} + \rho_{12n} = U_{on} + L_{1n} + L_{2n} + \rho_{22n}$ where $C_f^n$ is transformation from ECEF to NAV with $d(C_f^n) = [\delta\theta]\cdot C_f^n$ (see next chart for derivation)

$dS_{1n} = [\delta\theta]\cdot S_{1n} + C_f^n \cdot dS_{1f}$ $dS_{2n} = [\delta\theta]\cdot S_{2n} + C_f^n \cdot dS_{2f}$

FIG. 14

$C_f^c = [I+\delta\theta]\cdot C_f^n$ $d(C_f^n) = C_f^c - C_f^n = [\delta\theta]\cdot C_f^n$ ECEF $\xrightarrow{C_f^n}$ NAV $\xrightarrow{[I+\delta\theta]}$ COMPUTER ECEF $\xrightarrow{C_f^c}$ COMPUTER

FIG. 15

Express $U_1, U_2, dU_1, dU_2$ as:

$U_{1n} = U_{0n} + C_b^n \cdot L_{1b}$ where $C_b^n$ is transformation from BODY to NAV $U_{2n} = U_{0n} + C_b^n \cdot (L_{1b} + L_{2b})$ with $d(C_b^n) = [\phi] \cdot C_b^n$ (attitude error effect)

$dU_{1n} = dU_{0n} + [\phi] \cdot L_{1n} + C_b^n \cdot dL_{1b}$ $dU_{2n} = dU_{0n} + [\phi] \cdot (L_{1n} + L_{2n}) + C_b^n \cdot (dL_{1b} + dL_{2b})$

FIG. 16

$(\delta DD\rho)_c =$ $\rho_{11n} \cdot \{[\delta\theta] \cdot U_{0n} + C_f^n \cdot dS_{1f} - dU_{0n} - [\psi] \cdot L_{1n} - C_b^n \cdot dL_{1b}\}/\rho_{11}$ $-\rho_{12n} \cdot \{[\delta\theta] \cdot U_{0n} + C_f^n \cdot dS_{2f} - dU_{0n} - [\psi] \cdot L_{1n} - C_b^n \cdot dL_{1b}\}/\rho_{12}$ $-\rho_{21n} \cdot \{[\delta\theta] \cdot U_{0n} + C_f^n \cdot dS_{1f} - dU_{0n} - [\psi] \cdot (L_{1n} + L_{2n}) - C_b^n \cdot (dL_{1b} + dL_{2b})\}/\rho_{21}$ $+\rho_{22n} \cdot \{[\delta\theta] \cdot U_{0n} + C_f^n \cdot dS_{2f} - dU_{0n} - [\psi] \cdot (L_{1n} + L_{2n}) - C_b^n \cdot (dL_{1b} + dL_{2b})\}/\rho_{22}$ where $\psi = \phi - \delta\theta$

FIG. 17

$$[\delta\theta] = \begin{vmatrix} 0 & \delta\theta_z & -\delta\theta_y \\ -\delta\theta_z & 0 & \delta\theta_x \\ \delta\theta_y & -\delta\theta_x & 0 \end{vmatrix}, \quad [\phi] = \begin{vmatrix} 0 & \phi_z & -\phi_y \\ -\phi_z & 0 & \phi_x \\ \phi_y & -\phi_x & 0 \end{vmatrix}$$

$$C_f^n = \begin{vmatrix} C_{f11}^n & C_{f12}^n & C_{f13}^n \\ C_{f21}^n & C_{f22}^n & C_{f23}^n \\ C_{f31}^n & C_{f32}^n & C_{f33}^n \end{vmatrix}, \quad C_b^n = \begin{vmatrix} C_{b11}^n & C_{b12}^n & C_{b13}^n \\ C_{b21}^n & C_{b22}^n & C_{b23}^n \\ C_{b31}^n & C_{b32}^n & C_{b33}^n \end{vmatrix}$$

$$H_1 = -(L_{2zn}\nabla\rho_{2yn} - L_{2yn}\nabla\rho_{2zn}) - (L_{1zn}\nabla\Delta\rho_{yn} - L_{1yn}\nabla\Delta\rho_{zn})$$
$$H_2 = -(L_{2xn}\nabla\rho_{2zn} - L_{2zn}\nabla\rho_{2xn}) - (L_{1xn}\nabla\Delta\rho_{zn} - L_{1zn}\nabla\Delta\rho_{xn})$$
$$H_3 = -(L_{2yn}\nabla\rho_{2xn} - L_{2xn}\nabla\rho_{2yn}) - (L_{1yn}\nabla\Delta\rho_{xn} - L_{1xn}\nabla\Delta\rho_{yn})$$
$$H_4 = -H_1 + (a+h)\cdot\nabla\Delta\rho_{yn}$$
$$H_5 = -H_2 - (a+h)\cdot\nabla\Delta\rho_{xn}$$
$$H_6 = -H_3$$
$$H_7 = -\nabla\Delta\rho_{zn}$$
$$H_8 = -\nabla\rho_{2xn}C^n_{b11} - \nabla\rho_{2yn}C^n_{b21} - \nabla\rho_{2zn}C^n_{b31}$$
$$H_9 = -\nabla\rho_{2xn}C^n_{b12} - \nabla\rho_{2yn}C^n_{b22} - \nabla\rho_{2zn}C^n_{b32}$$
$$H_{10} = -\nabla\rho_{2xn}C^n_{b13} - \nabla\rho_{2yn}C^n_{b23} - \nabla\rho_{2zn}C^n_{b33}$$
$$H_{11} = -\nabla\Delta\rho_{xn}C^n_{b11} - \nabla\Delta\rho_{yn}C^n_{b21} - \nabla\Delta\rho_{zn}C^n_{b31}$$
$$H_{12} = -\nabla\Delta\rho_{xn}C^n_{b12} - \nabla\Delta\rho_{yn}C^n_{b22} - \nabla\Delta\rho_{zn}C^n_{b32}$$
$$H_{13} = -\nabla\Delta\rho_{xn}C^n_{b13} - \nabla\Delta\rho_{yn}C^n_{b23} - \nabla\Delta\rho_{zn}C^n_{b33}$$
$$H_{14} = -\Delta\rho_{1xn}C^n_{f11} - \Delta\rho_{1yn}C^n_{f21} - \Delta\rho_{1zn}C^n_{f31}$$
$$H_{15} = -\Delta\rho_{1xn}C^n_{f12} - \Delta\rho_{1yn}C^n_{f22} - \Delta\rho_{1zn}C^n_{f32}$$
$$H_{16} = -\Delta\rho_{1xn}C^n_{f13} - \Delta\rho_{1yn}C^n_{f23} - \Delta\rho_{1zn}C^n_{f33}$$
$$H_{17} = -\Delta\rho_{2xn}C^n_{f11} - \Delta\rho_{2yn}C^n_{f21} - \Delta\rho_{2zn}C^n_{f31}$$
$$H_{18} = -\Delta\rho_{2xn}C^n_{f12} - \Delta\rho_{2yn}C^n_{f22} - \Delta\rho_{2zn}C^n_{f32}$$
$$H_{19} = -\Delta\rho_{2xn}C^n_{f13} - \Delta\rho_{2yn}C^n_{f23} - \Delta\rho_{2zn}C^n_{f33}$$

FIG. 20

|  | symbol | # of states | frame |
|---|---|---|---|
| Attitude | $(\phi)$ | 3 | NAV |
| Level Position | $(\delta\theta_{x,y})$ | 2 | NAV |
| Computer Azimuth | $(\delta\theta_z)$ | 1 | NAV |
| Altitude | $(dh)$ | 1 | NAV |
| Lever arm 2 | $(dL_{2b})$ | 3 | BODY |
| Lever arm 1 | $(dL_{1b})$ | 3** | BODY |
| Satellite 1 position | $(dS_{1f})$ | 3** | ECEF |
| Satellite 2 position | $(dS_{2f})$ | 3** | ECEF |
|  |  | 19 |  |

** small/negligible contributors

FIG. 21

$$\Delta\bar{p}_1 = \bar{p}_{21}/p_{21} - \bar{p}_{11}/p_{11} = [\Delta p_{1xn}, \Delta p_{1yn}, \Delta p_{1zn}]' = \Delta p_{1n}$$

$$\Delta\bar{p}_2 = \bar{p}_{22}/p_{22} - \bar{p}_{12}/p_{12} = [\Delta p_{2xn}, \Delta p_{2yn}, \Delta p_{2zn}]' = \Delta p_{2n}$$

$$\nabla\bar{p}_2 = \bar{p}_{22}/p_{22} - \bar{p}_{21}/p_{21} = [\nabla p_{2xn}, \nabla p_{2yn}, \nabla p_{2zn}]' = \nabla p_{2n}$$

$$\nabla\Delta\bar{p} = \Delta\bar{p}_2 - \Delta\bar{p}_1 = [\nabla\Delta p_{xn}, \nabla\Delta p_{yn}, \nabla\Delta p_{zn}]' = \nabla\Delta p_n$$

FIG. 22

$\Delta p_{1n} = [-1.80E-8, -2.89E-8, -6.62E-9]'$ 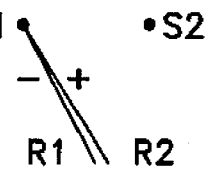

$\Delta p_{2n} = [1.60E-14, -4.33E-8, -1.55E-8]'$ 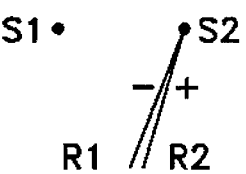

$\nabla p_{2n} = [-0.782, 0.217, 0.654]'$ 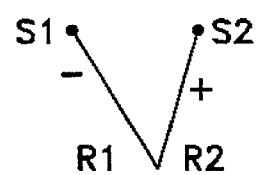

$\nabla\Delta p_n = [1.80E-8, -1.44E-8, -8.83E-9]'$ 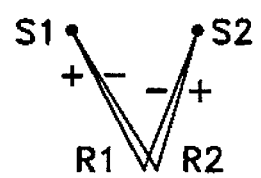

FIG. 23

$$H_1 = -(L_{2zn}\nabla\rho_{2yn} - L_{2yn}\nabla\rho_{2zn}) - (L_{1zn}\nabla\Delta\rho_{yn} - L_{1yn}\nabla\Delta\rho_{zn})$$

$$H_2 = -(L_{2xn}\nabla\rho_{2zn} - L_{2zn}\nabla\rho_{2xn}) - (L_{1xn}\nabla\Delta\rho_{zn} - L_{1zn}\nabla\Delta\rho_{xn})$$

$$H_3 = -(L_{2yn}\nabla\rho_{2xn} - L_{2xn}\nabla\rho_{2yn}) - (L_{1yn}\nabla\Delta\rho_{xn} - L_{1xn}\nabla\Delta\rho_{yn})$$

$$H_4 = -H_1 + (a+h) \cdot \nabla\Delta\rho_{yn}$$

$$H_5 = -H_2 - (a+h) \cdot \nabla\Delta\rho_{xn}$$

$$H_6 = -H_3$$

$$H_7 = -\nabla\Delta\rho_{zn}$$

$$H_8 = -\nabla\rho_{2xn}C^n_{b11} - \nabla\rho_{2yn}C^n_{b21} - \nabla\rho_{2zn}C^n_{b31}$$

$$H_9 = -\nabla\rho_{2xn}C^n_{b12} - \nabla\rho_{2yn}C^n_{b22} - \nabla\rho_{2zn}C^n_{b32}$$

$$H_{10} = -\nabla\rho_{2xn}C^n_{b13} - \nabla\rho_{2yn}C^n_{b23} - \nabla\rho_{2zn}C^n_{b33}$$

FIG. 24

| STATES | SYMBOL | NUMBER OF STATES |
|---|---|---|
| LEVEL POSITION | $\delta\theta_{x,y}$ | 2 |
| COMPUTER AZIMUTH | $\delta\theta_z$ | 1 |
| VELOCITY | $\delta V$ | 3 |
| ATTITUDE | $\delta\phi$ | 3 |
| ALTITUDE | $\delta H$ | 1 |
| ACCELEROMETER | | |
|   BIAS | $\nabla$ | 3 |
|   SCALE FACTOR | $\nabla_{sf}$ | 3 |
|   MISALIGNMENT | $\nabla_m$ | 6 |
| GYRO | | |
|   BIAS | $\varepsilon$ | 3 |
|   SCALE FACTOR | $\varepsilon_{sf}$ | 3 |
|   MISALIGNMENT | $\varepsilon_m$ | 3 |
| BAROMETRIC ALTIMETER | | |
|   BIAS | B | 1 |
|   SCALE FACTOR | $B_{sf}$ | 1 |
| GPS USER CLOCK | | |
|   PHASE | SVC | 1 |
|   FREQUENCY | SVF | 1 |
| LEVER ARM | $\delta L$ | 6 |
| | | 41 |

FIG. 25

| TIME(sec) | |
|---|---|
| 0–210 | INITIALIZATION |
| | Heading     0 degrees |
| | Latitude    45 degrees |
| | Speed       0.0 ft/sec |
| 210–350 | TAKE-OFF |
| | Accelerate to 200 ft/sec in 20 seconds |
| | Climb to 2000 ft in 120 seconds |
| 350–390 | Level flight |
| 390–470 | Accelerate to 600 ft/sec |
| 470–510 | Level flight |
| 510–540 | 1 g, 90 degree coordinated turn to east |
| 540–780 | Level flight |
| 780–1200 | Climb to 30,000 ft |
| 1200–3600 | Level flight |

FIG. 26

| TYPE OF UPDATE | INITIAL UPDATE | FREQUENCY OF UPDATE | NUMBER OF UPDATES |
|---|---|---|---|
| NULL VELOCITY GROUND ALIGNMENT | 1 sec | 1 sec | 3 (x,y,z) |
| GPS (R, ΔR) | 212 sec | 4 sec | 8 (for each 4 SVs) |
| GPS INTERFEROMETRY | 214 sec | 4 sec | 12 (for each SV pair and each antenna pair) |
| BAROMETRIC ALTIMETER | 215 sec | 4 sec | 1 |

LEVER ARM FROM FIRST ANTENNA TO SECOND ANTENNA     10 m or 1 m
LEVER ARM FROM FIRST ANTENNA TO THIRD ANTENNA      10 m or 1 m

FIG. 27

- ACCELEROMETER
    BIAS                    200 μg
    SCALE FACTOR            267 PPM
    ASYMMETRY               133 PPM
    MISALIGNMENT            20 ARCSEC
    NONLINEARITY            17 μg/g$^2$ ALONG
                            8 μg/g$^2$ CROSS
    WHITE NOISE             50 μg/√Hz
    CORRELATED NOISE        70 μg AT 100 SEC CT
    THERMAL TRANSIENT       100 μg AT 120 SEC TC

- GYRO
    BIAS                    1 DEG/HR
    SCALE FACTOR            100 PPM
    MISALIGNMENT            20 ARCSEC
    WHITE NOISE             0.1 DEG/√HR
    CORRELATED NOISE        0.6 DEG/HR AT 100 SEC CT

NOTE: CT = CORRELATION TIME, TC = TIME CONSTANT

FIG. 28

SVC PHASE                   3.5 M
SVC FREQUENCY               .00037 M/S
EPHEMERIS POSITION          4.2 M
EPHEMERIS RATE              .00037 M/S
TROPOSPHERE                 2 M* @ 1 HR CT
IONOSPHERE                  1.2 M @ 2 MIN
                            STATE3 ADDS .002 M/S
MULTIPATH WHITE NOISE       1.2 M
USER CLOCK
    FREQUENCY               3 M/S @ 1.5 HRS CT
    PHASE                   30 M
    AGING
        BIAS                9.07 μM/S$^2$
        WHITE NOISE         0.015 M/S√HZ
        G-SENSITIVITY (X,Y,Z)   0.6 M/SEC/G; 0.15 M/SEC/G
CODE WHITE NOISE            0.5 M
CARRIER WHITE NOISE         0.02 M
RANGE BIAS                  0.91 M @ 40 MIN
DELTA RANGE BIAS            0.015 M @ 40 MIN

*multiplied by a function of elevation

FIG. 29

- ATTITUDE INITIAL CONDITIONS
    - TILT (X,Y)  0.5 DEG
    - AZIMUTH (Z)  2.0 DEG
- GRAVITY DISTURBANCE
    - DEFLECTION (E/W, N/S)  $25\mu g$ (20 NM CD)
    - ANOMALY  $25\mu g$ (20 NM CD)
- NULL VELOCITY REF WHITE NOISE (X,Y,Z)  0.01 FT/SEC
- BAROMETER
    - BIAS  100 FT
    - CORRELATED NOISE  20 FT @600 SEC CT
    - SCALE FACTOR  5%
    - WHITE NOISE  20 FT
- GPS ATTITUDE DETERMINATION ERRORS
    - MEASUREMENT NOISE  0.01 M
    - LEVER ARM  0.03 M

NAVAGATION APPARATUS WITH IMPROVED ATTITUDE DETERMINATION

BACKGROUND OF INVENTION

This invention relates generally to satellite-inertial navigation systems and more particularly to methods and apparatus for determining the attitude of platforms in a satellite-inertial navigation environment.

The Global Positioning System (GPS), the current exemplar of a satellite navigation system, consists of 24 globally-dispersed satellites with synchronized atomic clocks. Each satellite transmits a coded signal having the satellite clock time embedded in the signal and carrying information concerning the emphemerides of the satellites and its own daily emphemeris and clock corrections. A user obtains the essential data for determining his position and clock error by measuring the differences in his receiver clock time and the satellite clock times embedded in the signals from at least four viewable satellites. The difference in receiver clock time and satellite clock time multiplied by the radio wave propagation velocity is called the pseudorange and is equal to the range to the satellite plus the incremental range equivalent of satellite clock error minus the receiver clock error.

The user also obtains the essential data for determining his velocity by measuring for each satellite the difference in the frequency of the actual satellite signal and the frequency of the satellite signal if it had been generated using the receiver clock. The accumulated change in phase over a fixed period of time resulting from this frequency difference expressed in units of distance is called the delta range and is equal to the change in satellite range over the fixed period of time plus the change in the difference in the receiver and satellite clocks over the same fixed period of time multiplied by the radio wave propagation velocity.

The user, knowing the positions, velocities, and clock errors of the satellites, can compute his own position, velocity, and clock error from the measured pseudoranges and delta ranges.

Since the more significant errors in GPS-determined positions of nearby platforms are highly correlated, these errors tend to cancel out in determining the relative positions of the platforms. The use of GPS for making highly-accurate relative position determinations of nearby platforms is referred to as differential GPS.

The accuracy attainable with differential GPS suggests the use of interferometric GPS for determining the attitude of a platform. Interferometric GPS denotes the use of satellite signal carrier phase measurements at different points on a platform for accurately determining the orientation of the platform (and the other Kalman states) from highly-accurate position updates.

The use of three spatially-distributed antennas on a platform permits the accurate determination with GPS signals alone of pitch, roll, and heading. However, if the platform is a highly-maneuverable aircraft, it becomes necessary to integrate the platform GPS equipment with an inertial navigation unit. GPS compensates for inertial navigation system drifts and when platform maneuvering or other occurrences causes GPS to become temporarily inoperative, the inertial navigation system (INS) carries on until the GPS again becomes operative.

BRIEF SUMMARY OF INVENTION

The navigation apparatus with improved attitude determination is intended for use on a mobile platform. It combines data from a platform inertial navigation unit and carrier phase data for a plurality of GPS satellite signals received at a plurality of receiving points on the platform for the purpose of obtaining estimates of the navigation states of the platform. The navigation apparatus comprises a processor which computes estimates of the states from inputs comprising (1) one or more measured phase double-differences calculated from the measured satellite signal carrier phases, (2) the estimated position of the platform, (3) the estimated positions of the receiving points, and (4) the positions of the satellites, a phase double-difference being defined as the difference in phase differences for signals received from two satellites and a phase difference being defined as the difference in carrier phase of a satellite signal received at two receiving points.

The navigation solution is obtained by means of a Kalman filter process wherein the observables comprise measured phase double-differences and each predicted phase double-difference is obtained by operating on the Kalman state vector with an observation matrix defined by linearizing the equations relating the phase double-difference to the navigation states.

BRIEF DESCRIPTION OF DRAWINGS

FIG. 3 shows a block diagram of the preferred embodiment of the invention.

FIG. 4 expands the attitude determination geometry of FIG. 2 to include vectors which specify the locations of the two receiving points and the two satellites with respect to earth center.

FIG. 5 gives the mathematical definition of pseudorange.

FIG. 6 gives the mathematical definition of the carrier phase observation.

FIG. 7 shows how clock errors can be eliminated by taking single differences in phase.

FIG. 8 shows how two ways of double differencing give the same result.

FIG. 9 expands the phase double-difference into its component parts.

FIG. 10 contains definitions of terms that are used later in the mathematical development.

FIG. 11 defines the observation z which leads to a minimal mean-square-error estimate of platform attitude.

FIG. 12 shows how the linearization of $P_{ij}-\rho_{ij}$ is accomplished.

FIG. 13 shows a linearized version of the first equation of FIG. 12.

FIG. 14 shows how the S and dS vectors of FIG. 13 are transformed from ECEF to NAV coordinates.

FIG. 15 shows the relationships among the ECEF, NAV, and COMPUTER frames of reference.

FIG. 16 shows how the U and dU vectors of FIG. 13 are transformed from ECEF to NAV coordinates.

FIG. 17 shows the equation obtained by substituting the equations of FIGS. 14 and 16 in the equation of FIG. 13.

FIG. 18 defines the matrix components appearing in FIG. 17.

FIG. 19 defines the vector components appearing in FIG. 17.

FIG. 20 shows the components of the observation matrix.

FIG. 21 identifies the Kalman states that are associated with the double-difference observation matrix.

FIG. 22 defines the abbreviations used in FIG. 20.

FIG. 23 gives the relative magnitudes of the quantities listed in FIG. 22.

FIG. 24 shows the components of the simplified observation matrix.

FIG. 25 identifies the Kalman states used in the simulation for the system illustrated in FIG. 3.

FIG. 26 defines the aircraft trajectory for a simulation of the system of FIG. 3.

FIG. 27 lists the update schedule for the simulation of the system of FIG. 3.

FIG. 28 gives the one-sigma error budget for the LN-200 inertial navigation unit.

FIG. 29 gives the one-sigma GPS error budget.

DESCRIPTION OF THE PREFERRED EMBODIMENT

Figure 1:
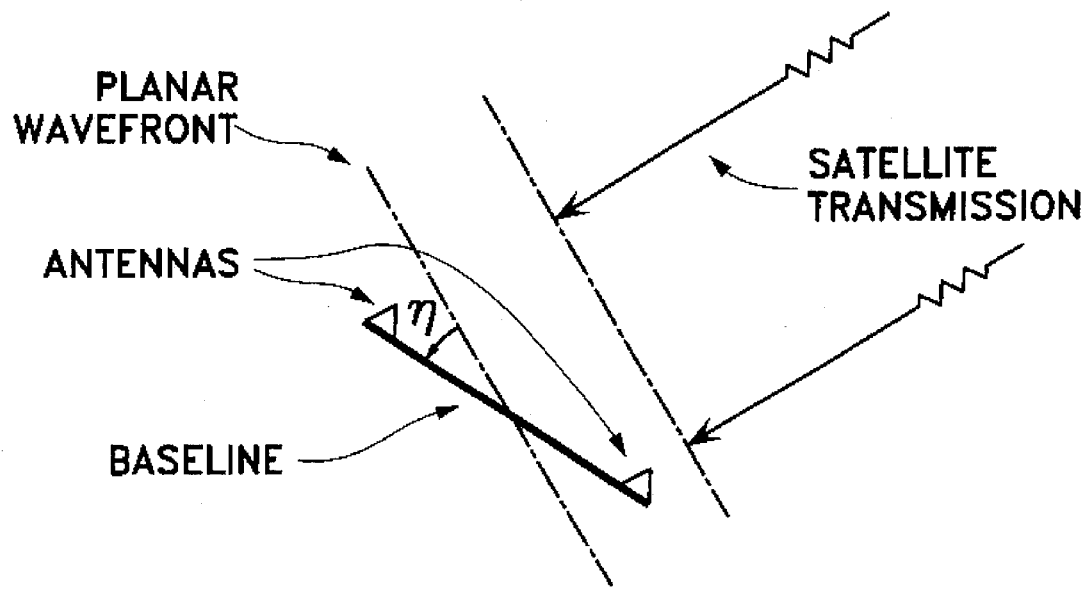
FIG. 1 illustrates the basis for attitude determination in the GPS environment.

The present invention utilizes a fully-integrated combination of interferometric GPS and a low-cost inertial navigation system (INS) to provide attitude as part of the INS solution. The basis for attitude determination in the GPS environment is illustrated in FIG. 1 which shows wavefronts associated with a satellite transmission incident on two antennas that are endpoints of a baseline. The difference in satellite signal phase at the two ends of the baseline provides the means for calculating the angle between the baseline and the satellite signal wavefront in the plane of the antennas and the satellite being observed.

In the customary use of this approach, the carrier phase obtained at each antenna is differenced for two satellite signals at each time point and these differences are then further (second) differenced between the two antennas to remove unknown progapation path effects, the satellite clock errors, and any unknown pertubations of the GPS satellite orbits. It is this differencing that results in the extremely low noise receiver phase measurement allowing the baseline angle to be determined with high accuracy.

The difference in satellite signal phase for two satellites provides the means for calculating heading which, when integrated with an INS, is sufficient for determining the attitude of the antenna baseline and the platform which carries the antennas.

Figure 2:
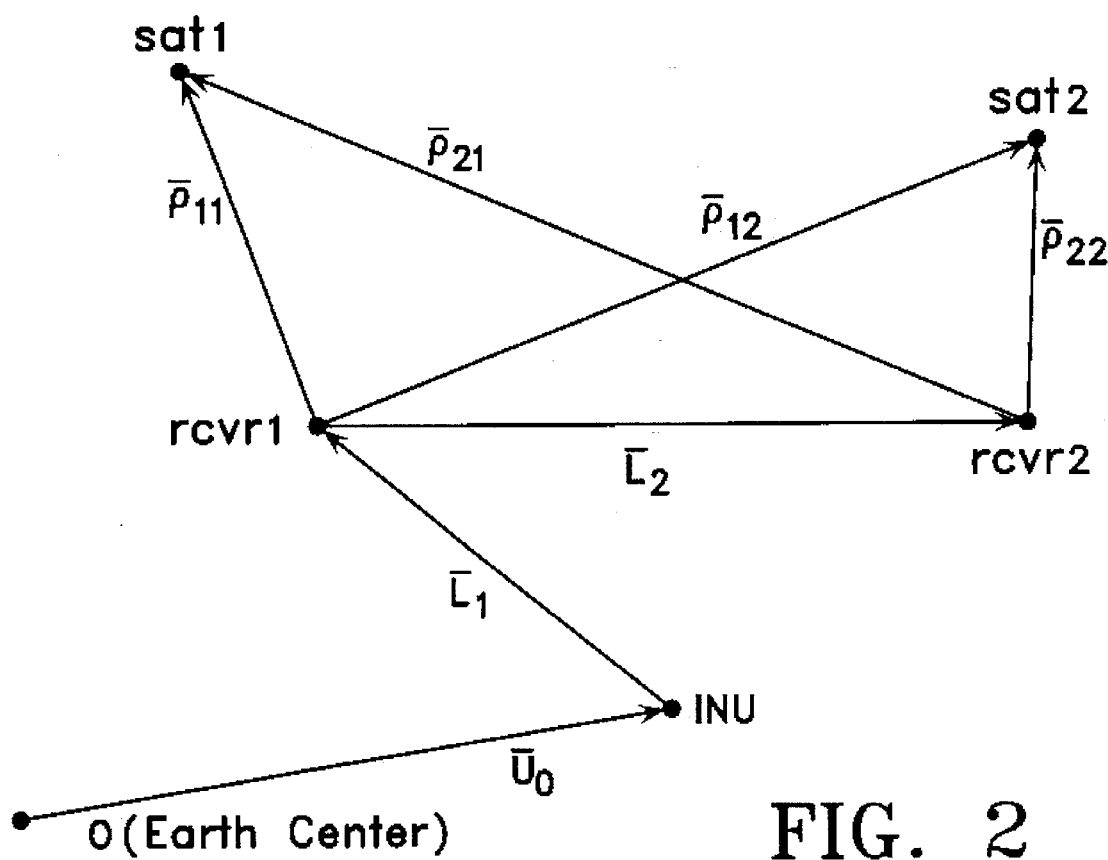
FIG. 2 defines the attitude determination geometry in terms of earth center, the inertial navigation unit position, the positions of two receiving points for satellite signals, and the positions of two satellites.

The geometry is shown in FIG. 2. The locations of the inertial navigation unit (INU), the two antennas associated with the two receivers rcvr1 and rcvr2 for measuring pseudorange, delta range, and carrier phase, and the two satellites sat1 and sat2 are defined relative to earth center O by the vectors shown in the figure.

A block diagram of the preferred embodiment of the invention is shown in FIG. 3. Antennas A1 and A2 feed signals from at least two satellites and preferably from all viewable satellites to the two GPS receivers R1 and R2.

The GPS receiver R1 supplies to combiner C1 measured pseudoranges and delta ranges associated with a plurality of viewable satellites. The Kalman filter K1 supplies to combiner C1 (via the dashed line) computed user clock error and user clock rate error which are subtracted from the pseudoranges and delta ranges respectively in the combiner C1. The resulting User Clock Adjusted (UCA) pseudoranges and UCA delta ranges are supplied by the combiner C1 to the Kalman filter K1.

The GPS receiver R2 supplies to combiner C2 measured pseudoranges and delta ranges which are transformed in combiner C2 into UCA pseudoranges and UCA delta ranges and supplied to the Kalman filter K1 in the same way as the GPS receiver R1 quantities.

The GPS receivers R1 and R2 supply the measured carrier phases $\Phi_{1i}$ and $\Phi_{2i}$ respectively of the signals they receive from the viewable satellites to the double-difference processor P1, i taking on the values associated with the viewable satellites.

The double-difference processor P1 obtains the measured phase double-difference $(DD\Phi)_{ij}=[(\Phi_{2i}-\Phi_{2j})-(\Phi_{1i}-\Phi_{1j})]$, corrects it with data supplied by the Kalman filter K1 (via the dashed line), and supplies the corrected phase double-difference to the Kalman filter K1.

The GPS receivers R1 and R2 extract satellite ephemeris data, satellite clock and clock rate errors, and synchronization data from the satellite signals and supply this data to range processor P2.

The inertial navigation unit (INU) I1, a Litton LN-200 model, supplies to combiner C3 platform acceleration measured by accelerometers fixed to the platform and platform angular rotation rate measured by gyros also fixed to the platform. This data is corrected in combiner C3 for accelerometers and gyro bias, scale factor error, and misalignment using data supplied via the dashed line by the Kalman filter K1. The corrected data is supplied by the combiner C3 to the navigation processor P3.

A barometric altimeter, not shown in FIG. 3, is used to provide a platform altitude input through combiner C3 to the navigation processor P3. Corrections for altimeter bias and scale factor errors are supplied to the combiner by the Kalman filter K1. The navigation processor P3 uses the platform acceleration, angular rotation rate, and altitude to periodically compute the position, velocity, and attitude of the platform. These quantities are corrected with data supplied by the Kalman filter K1 (via the dashed line), and corrected data is passed on to the range processor P2.

The range processor P2 uses this corrected data together with satellite ephemeris data to obtain computed ranges, delta ranges, and phase double-differences. The range processor P2 subtracts satellite clock error from each computed range and subtracts satellite clock rate error from each computed delta range thereby obtaining quantities analogous to the UCA pseudorange and UCA delta range supplied by the GPS receivers R1 and R2 to the Kalman filter K1 via combiners C1 and C2 respectively. These computed UCA pseudorange analogs, computed UCA delta range analogs, and computed phase double-differences are supplied to the Kalman filter K1.

The Kalman filter K1 obtains a minimal mean-square-error solution of the navigation problem and supplies corrections to the input data in anticipation of the next iteration of the Kalman process, as indicated by the dotted lines in FIG. 3. The Kalman process is well-known and understood and will not be described here since it is described in detail in a number of textbooks, one example being A. Gelb, ed., *Applied Optimal Estimation*, The Analytical Sciences Corporation, The M.I.T. Press, Cambridge, Mass., 1974.

The key to the reliable determination of platform attitude is the phase double-difference which minimally requires carrier phase measurements of the signals received from at least two satellites at two or more separated points in space, the points being fixed with respect to the platform. The derivation of the Kalman filter observation matrix for double-differencing will be shown in the paragraphs that follow.

The geometry of FIG. 2 is further defined in FIG. 4 with the addition of vectors which specify the locations of the two receiving points rcvr1 and rcvr2 and the two satellites sat1 and sat2 with respect to the earth's center O. At the top of the figure, these four vectors are defined in terms of other vectors in the figure.

The mathematical definitions of pseudorange and carrier phase are defined in FIGS. 5 and 6.

It is shown in FIG. 7 how clock errors can be eliminated by taking single differences in phase. The differencing of the phases of the signals received from two satellites by one receiver removes the receiver clock error that appears in both phases. The differencing of the phases of the signals received by two receivers from the same satellite removes the satellite clock error that appears in both phases.

It is shown in FIG. 8 how two ways of double differencing give the same result. In other words, the process of double differencing is commutative.

The phase double-difference of FIG. 8 is expanded into its component parts (see FIG. 7) in FIG. 9. The terms reflecting the effects of the troposphere and the ionosphere tend to cancel since each pair in parentheses corresponds to signals from a common satellite which travel through the same region of space in arriving at the two receiving points.

Some definitions of terms which will appear in the paragraphs that follow are given in FIG. 10.

The Kalman filter observation that leads to a minimal mean-square-error estimate of attitude is z which is defined in FIG. 11 as the difference between the computed phase double-difference and the measured phase double-difference. The quantity z is related to the Kalman state residuals $\bar{x}$ by the observation matrix H, as shown by the last equation of FIG. 11. The derivation of the observation matrix is shown in FIGS. 12–18.

The first equation of FIG. 12 is obtained from the first and third equations of FIG. 10. The linearization of the quantities $p_{ij} - \rho_{ij}$ is shown in the remaining equations of FIG. 12.

The first equation of FIG. 12 with the help of the last equation of FIG. 12 can be written as shown in FIG. 13.

In FIG. 14 subscripts n (standing for "navigation (NAV) coordinate system") and f (standing for "earth-centered earth-fixed (ECEF) coordinate system") identify the coordinate frame of reference for the components of the vectors appearing in earlier figures. The first two equations in the figure are evident from FIG. 4. The derivation of the differential of the transformation matrix $C_f^n$ is shown by the first two equations of FIG. 15. The last two lines of FIG. 15 show the relationships among the ECEF, NAV, and COMPUTER frames of reference.

The components of the $U_i$ and $dU_i$ vectors in the NAV frame of reference are given in FIG. 16.

The substitution of the equations of FIGS. 14 and 16 in the equation of FIG. 13 results in the equation shown in FIG. 17.

The expression of the equation of FIG. 17 in terms of the matrix components given in FIG. 18 and the vector components given in FIG. 19 and a comparison of the resulting equation with the defining equation for the single-row observation matrix H given in FIG. 11 enables the components of the observation matrix to be identified. These components are given in FIG. 20. The subscripts identifying the H components correspond to the Kalman states listed in FIG. 21. Other states not associated with the observation matrix also exist.

The plural states listed for a single symbol are ordered as x, y, and z. The term denoted as "computer azimuth" refers to the error about vertical due to variation of the North direction with longitude error. Abbreviations used in FIG. 20 are defined in FIG. 22.

The relative magnitudes of the quantities listed in FIG. 22 are indicated in FIG. 23. Since terms involving $\Delta$ are much smaller than terms involving $\nabla$, states 11 through 19 in FIG. 20 can be dropped. The simplified H matrix is shown in FIG. 24. Further simplification is possible by omitting the double difference terms of $H_1$, $H_2$, and $H_3$.

The advantages of an attitude determination apparatus based on the integration of interferometric GPS with an inertial measurement unit are numerous. Heading error is far less than the error resulting from normal gyrocompassing. Attitude outputs are available from a calibrated INS during satellite signal shading or total jamming. The INS aids the lane ambiguity problem by providing position and attitude. Full attitude determination (i.e. pitch, roll, and heading) can be obtained from only two antennas on board the platform. Complete smoothed attitude is obtained during periods of high dynamics and/or jamming. And estimates can be obtained of the "lever arm", the vector defining the position of one antenna relative to another, and of changes in the lever arm as a result of antenna phase center migration. By judicious antenna motions this lever arm estimation can be substantially enhanced.

The attitude determination apparatus utilizes at least two antennas at the ends of a known lever arm and integrates the determination of attitude into the navigation solution for a platform by means of a Kalman filter. This integration approach requires at least three additional states in the Kalman state vector to define the lever arm for a minimal configuration of two antennas. The structure of the apparatus assumes that the lane ambiguity resolution occurs off-line.

The Kalman filter states for the system illustrated in FIG. 3 are listed in FIG. 25.

A simulation of the system shown in FIG. 3 with Kalman states as identified in FIG. 25 was performed for the aircraft trajectory defined in FIG. 26. The update schedule was as described in FIG. 27. The locations of the antennas with respect to the center of gravity are indicated at the bottom of FIG. 27.

The one-sigma error budget for the simulated LN-200 inertial navigation unit is shown in FIG. 28. The GPS error budget for range and delta range is shown in FIG. 29. The one-sigma values for other errors not included in FIGS. 28 and 29 are shown in FIG. 30.

The attitude determination apparatus makes little difference in the determination of the LN-200 east tilt and north tilt. The apparatus makes a very significant difference in the case of heading as shown in FIGS. 31 and 32.

Figures 30, 31:
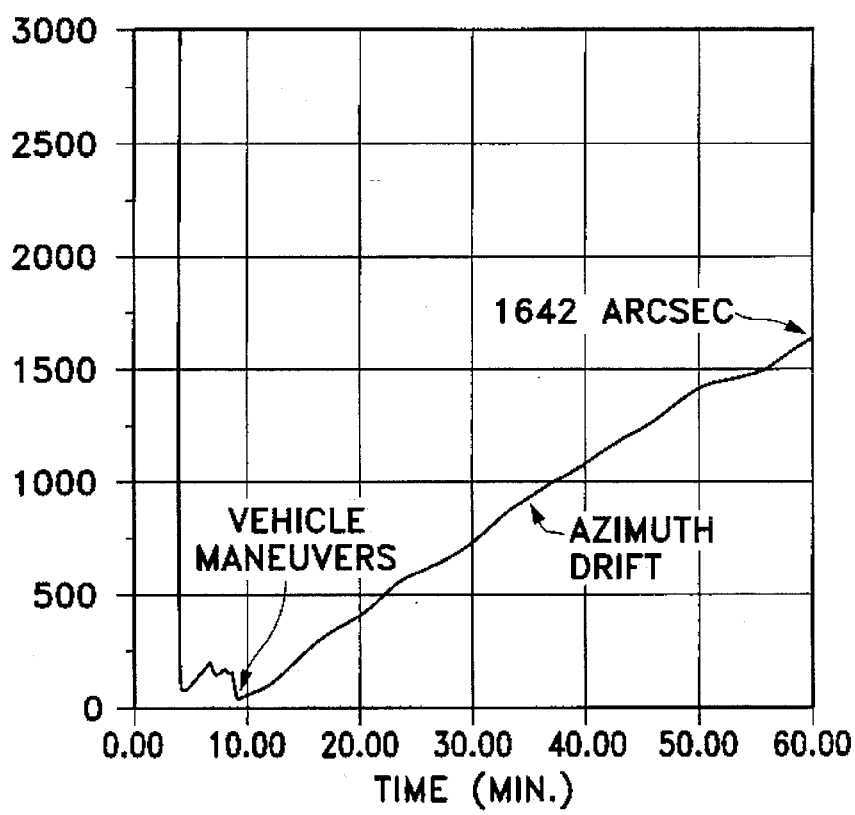
FIG. 30 gives the one-sigma error budget for quantities not included in FIGS. 28 and 29.
FIG. 31 shows the simulated performance of an integrated GPS-INS which uses only pseudorange and delta range updates.

The performance of an integrated GPS-INS which uses only pseudorange and delta range updates is shown in FIG. 31. The plot is azimuth angle in arcseconds as a function of time in minutes. The azimuth error increases essentially linearly with time reaching 1642 arcseconds at the end of 60 minutes.

Figure 32:
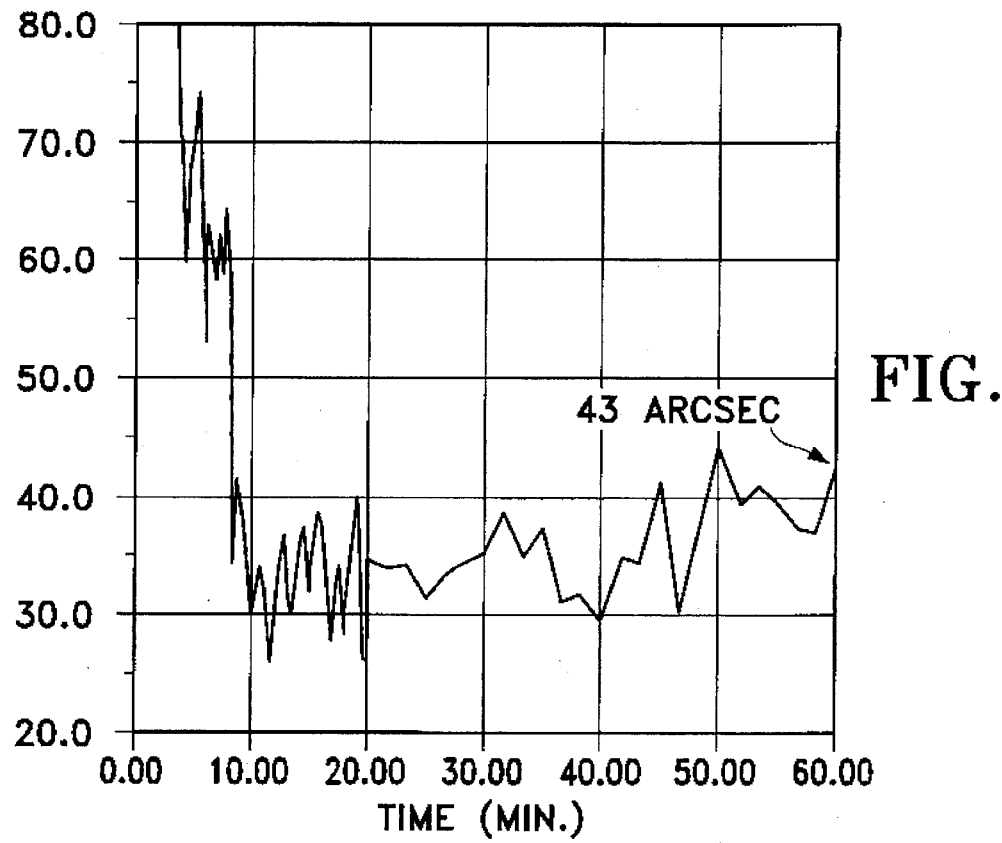
FIG. 32 shows the simulated performance of an integrated GPS-INS that incorporates the attitude determination feature of the present invention with two antennas spaced 10 meters apart on the aircraft.

The performance of an integrated GPS-INS that incorporates the attitude determination apparatus described herein is shown in FIG. 32. The excursion of the azimuth error is limited to approximately 40 arcseconds.

Figure 33:
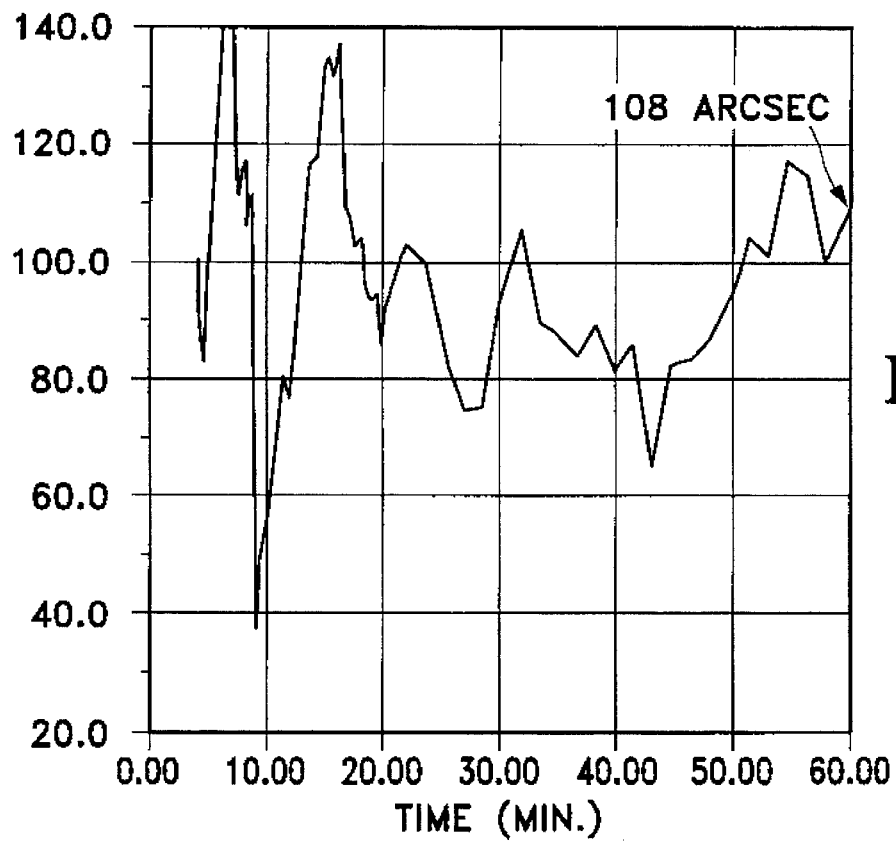
FIG. 33 shows the simulated performance of an integrated GPS-INS that incorporates the attitude determination feature of the present invention with two antennas spaced 1 meter apart on the aircraft.

The effect of different antenna spacings can be seen from FIGS. 32 and 33. The data shown in FIG. 32 pertains to the situation where a first antenna is located at the intersection of the longitudinal axis of the aircraft and an axis transverse to the longitudinal axis. A second antenna is spaced 10 meters from the first on the longitudinal axis of the aircraft and the third is spaced 10 meters from the first on the transverse axis. The data shown in FIG. 33 pertains to the situation where the second and third antennas are spaced 1 meter from the first antenna. An increase in the antenna spacing by a factor of 10 improves performance by only a factor of about 2.5.

What is claimed is:

1. An apparatus for use with a plurality of GPS earth satellites in estimating one or more states of a platform, the platform having a reference point that represents the position of the platform and at least two receiving points corresponding to the locations of antennas for receiving satellite signals, the apparatus comprising:

a processor for computing estimates of the errors in the platform states from inputs comprising (1) one or more measured phase double-differences obtained from signals transmitted by a plurality of satellites, (2) the estimated position of the reference point, (3) the estimated positions of the receiving points relative to the reference point, and (4) the positions of the satellites, a phase double-difference being defined as the difference in phase differences for signals received from two satellites, a phase difference being the difference in carrier phase of a satellite signal received at two receiving points on the platform.

2. The apparatus of claim 1 wherein the one or more states for which the processor computes estimates of errors include the platform attitude.

3. The apparatus of claim 1 wherein the one or more states for which the processor computes estimates of errors include the platform position in a level coordinate frame.

4. The apparatus of claim 1 wherein the one or more states for which the processor computes estimates of errors include the platform altitude.

5. The apparatus of claim 1 wherein the one or more states for which the processor computes estimates of errors include each receiving point position.

6. The apparatus of claim 1 wherein the one or more states for which the processor computes estimates of errors include a first receiving point position and the position of each remaining receiving point relative to the position of the first receiving point.

7. The apparatus of claim 1 wherein the one or more states for which the processor computes estimates of errors include the position of each receiving point other than a first receiving point relative to the first receiving point.

8. The apparatus of claim 1 further comprising:

a preprocessor which supplies the one or more measured double-differences to the processor, the one or more measured double-differences being determined by the preprocessor from inputs to the preprocessor, the inputs to the preprocessor comprising a plurality of measured phase differences.

9. The apparatus of claim 1 further comprising:

a preprocessor which supplies the one or more measured double-differences to the processor, the one or more measured double-differences being determined by the preprocessor from inputs to the preprocessor, the inputs to the preprocessor comprising the measured carrier phases of signals from a plurality of satellites received at a plurality of receiving points on the platform.

10. The apparatus of claim 1 wherein the processor computes estimates of the errors in the platform states by performing a Kalman filter process.

11. The apparatus of claim 10 wherein the processor in executing the Kalman filter process computes one or more predicted phase double-differences by applying an observation matrix to a state vector, the states in the state vector contributing to the predicted phase double-difference including platform attitude, platform position, computer azimuth, and the positions of the platform receiving points relative to one of the receiving points that serves as a reference point.

12. The apparatus of claim 1 wherein the inputs used by the processor in computing estimates of the errors in the platform states include (1) measured pseudoranges to the satellites and (2) satellite clock errors.

13. The apparatus of claim 12 wherein the inputs to the processor include an estimate of the platform velocity and measured delta ranges to the satellites, the one or more states for which the processor computes estimates of errors including the platform position in a level coordinate frame.

14. The apparatus of claim 13 wherein the one or more states for which the processor computes estimates of errors include the platform altitude.

15. The apparatus of claim 14 wherein the one or more states for which the processor computes estimates of errors include the platform velocity.

16. The apparatus of claim 15 further comprising:

a preprocessor which supplies platform position, velocity, and attitude to the processor, the platform position, velocity, and attitude being determined by the preprocessor from inputs to the preprocessor, the inputs to the preprocessor being the measured acceleration and measured angular rotation rate of the platform.

17. The apparatus of claim 16 wherein the one or more states for which the processor computes estimates of errors include bias, scale factor, and misalignment for each accelerometers and bias, scale factor, and misalignment for each gyro, the source of the measured platform acceleration being a plurality of accelerometers, the source of the measured platform angular rotation rate being a plurality of gyros.

18. The apparatus of claim 17 wherein the preprocessor utilizes the estimates by the processor of the errors in bias, scale factor, and misalignment for each accelerometers and bias, scale factor, and misalignment for each gyro to correct the input acceleration and angular rotation rate data.

19. The apparatus of claim 16 wherein the preprocessor utilizes the estimates by the processor of the errors in platform velocity and attitude to correct the preprocessor outputs of platform velocity and attitude.

20. The apparatus of claim 14 further comprising:

a preprocessor which supplies platform altitude to the processor, the platform altitude being obtained by the preprocessor from an input to the preprocessor, the input to the preprocessor being the measured altitude of the platform.

21. The apparatus of claim 20 wherein the one or more states for which the processor computes estimates of errors include bias and scale factor for an altimeter, the source of the measured platform altitude being the altimeter.

22. The apparatus of claim 21 wherein the preprocessor utilizes the estimates by the processor of the errors in bias and scale factor for the altimeter to correct the input altitude data.

23. The apparatus of claim 15 wherein the one or more states for which the processor computes estimates of errors include the user clock bias and the user clock rate bias, the user clock being the time reference utilized by the source of the pseudorange and delta range data supplied to the processor.

24. The apparatus of claim 23 wherein the processor computes estimates of the errors in the platform states by performing a Kalman filter process.

25. A method of using a plurality of GPS earth satellites for estimating one or more states of a platform, the platform having a reference point that represents the position of the platform and at least two receiving points corresponding to the locations of antennas for receiving satellite signals, the method comprising the steps:

computing estimates of the errors in the platform states from inputs comprising (1) one or more measured phase double-differences obtained from signals transmitted by a plurality of satellites, (2) the estimated position of the reference point, (3) the estimated positions of the receiving points relative to the reference point, and (4) the positions of the satellites, a phase double-difference being defined as the difference in phase differences for signals received from two satellites, a phase difference being the difference in carrier phase of a satellite signal received at two receiving points on the platform, arbitrary input values being used for those quantities for which input values are not supplied.

26. The method of claim 25 wherein the one or more states for which estimates of errors are computed include the platform attitude.

27. The method of claim 25 wherein the one or more states for which estimates of errors are computed include the platform position in a level coordinate frame.

28. The method of claim 25 wherein the one or more states for which estimates of errors are computed include the platform altitude.

29. The method of claim 25 wherein the one or more states for which estimates of errors are computed include each receiving point position.

30. The method of claim 25 further comprising the step:

computing the measured double-differences for input to the "computing estimates" step from a plurality of measured phase differences.

31. The method of claim 25 further comprising the step:

computing the measured double-differences for input to the "computing estimates" step from a plurality of measured carrier phases of signals from a plurality of satellites received at a plurality of receiving points on the platform.

32. The method of claim 25 wherein the estimates are computed by executing a Kalman filter process.

33. The method of claim 32 wherein in executing the Kalman filter process one or more predicted phase double-differences is obtained by applying an observation matrix to a state vector, the states in the state vector contributing to the predicted phase double-difference including platform attitude, platform position, computer azimuth, and the positions of the platform receiving points relative to one of the receiving points that serves as a reference point.

34. The method of claim 25 wherein the inputs used in computing estimates of the errors in the platform states include (1) measured pseudoranges to the satellites and (2) satellite clock errors.

35. The method of claim 34 wherein the inputs used in computing estimates of the errors in the platform states include an estimate of the platform velocity and measured delta ranges to the satellites, the one or more states for which estimates of errors are computed including the platform position in a level coordinate frame.

36. The method of claim 35 wherein the one or more states for which estimates of errors are computed include the platform altitude.

37. The method of claim 36 wherein the one or more states for which estimates of errors are computed include the platform velocity.

38. The method of claim 37 further comprising the step:

computing the position, velocity, and attitude for input to the "computing estimates" step from the measured acceleration and measured angular rotation rate of the platform.

39. The method of claim 38 wherein the one or more states for which estimates of errors are computed include bias, scale factor, and misalignment for each accelerometers and bias, scale factor, and misalignment for each gyro, the source of the measured platform acceleration being a plurality of accelerometers, the source of the measured platform angular rotation rate being a plurality of gyros.

40. The method of claim 39 further comprising the step:

correcting the input acceleration and angular rotation rate data utilizing the computed estimates of the errors in bias, scale factor, and misalignment for each accelerometers and bias, scale factor, and misalignment for each gyro.

41. The method of claim 38 further comprising the step:

correcting the platform velocity and attitude data that serve as inputs to the "computing estimates" step utilizing the computed estimates of the errors in platform velocity and attitude.

42. The method of claim 36 further comprising the step:

obtaining a measured value for the platform altitude from an altimeter;

supplying the measured platform altitude as input to the "computing estimates" step.

43. The method of claim 42 wherein the one or more states for which estimates of errors are computed include bias and scale factor for the altimeter that is the source of the measured altitude.

44. The method of claim 43 further comprising the step:

utilizing the computed estimates of the errors in bias and scale factor for the altimeter to correct the input altitude data.

45. The method of claim 37 wherein the one or more states for which estimates of errors are computed include the user clock bias and the user clock rate bias, the user clock being the time reference utilized by the source of the pseudorange and delta range data.

46. The method of claim 45 wherein the estimates are computed by executing a Kalman filter process.

* * * * *

UNITED STATES PATENT AND TRADEMARK OFFICE
CERTIFICATE OF CORRECTION

PATENT NO. : 5,543,804

DATED : August 6, 1996

INVENTOR(S) : Robert J. Buchler, Allan J. Brockstein and David Y. HSU

It is certified that error appears in the above-indentified patent and that said Letters Patent is hereby corrected as shown below:

On the title page: Item [54] and Column 1, line 1, the spelling of "NAVAGATION" in the title is incorrect. Please change to: "NAVIGATION"

Signed and Sealed this

Seventh Day of January, 1997

*Attest:*

BRUCE LEHMAN

*Attesting Officer*     *Commissioner of Patents and Trademarks*